March 24, 1931.  R. V. MORGENSTERN  1,797,667
METALLIC BATTERY SUPPLY FROM GROUNDED SOURCES
Filed Sept. 4, 1929
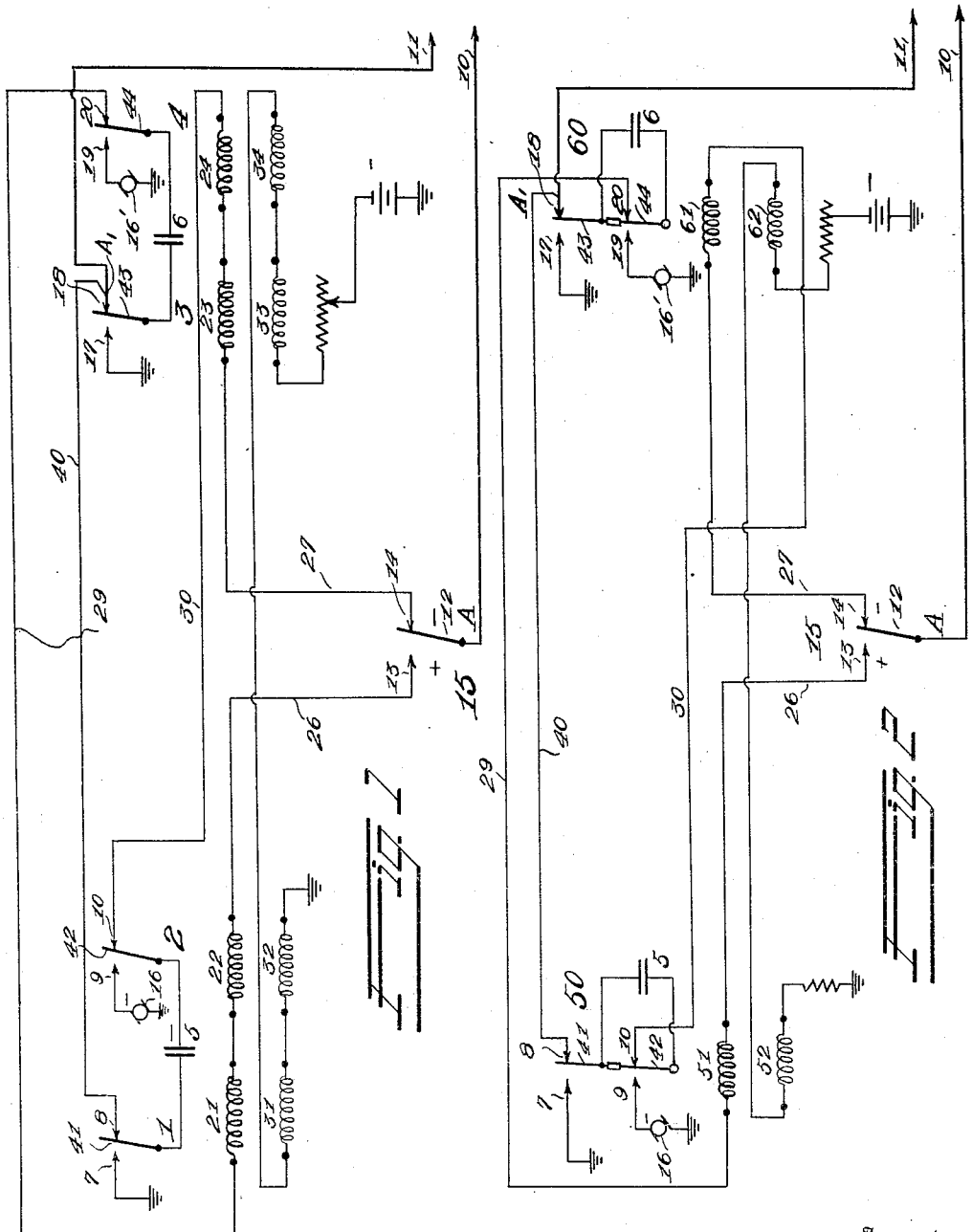

Patented Mar. 24, 1931

1,797,667

UNITED STATES PATENT OFFICE

RONALD V. MORGENSTERN, OF METUCHEN, NEW JERSEY, ASSIGNOR TO THE WESTERN UNION TELEGRAPH COMPANY, OF NEW YORK, N. Y., A CORPORATION OF NEW YORK

METALLIC BATTERY SUPPLY FROM GROUNDED SOURCES

Application filed September 4, 1929. Serial No. 390,342.

This invention relates to a method of obtaining metallic battery supply for metallic telegraph circuits from a grounded source. In particular, it comprises means for supplying metallic battery from the grounded battery which is found in all telegraph offices of any appreciable size through the medium of either very small storage batteries or large capacity condensers.

Another object of the invention is to obtain battery for a large number of metallic telegraph circuits from a common grounded source.

Other objects of the invention are to obtain metallic battery supply from a grounded source for a telegraph repeater, or for a metallic system of the superposed type, such as that described, for example, in my copending application Serial No. 258,948, filed March 3, 1928 for "superimposed telegraph circuits."

The fundamental principles of the invention are described hereinafter in connection with two specific arrangements for obtaining the metallic battery supply by the operation of relays designed to connect large capacity condensers alternately to the grounded source, for charging purposes, and to the metallic line into which the condensers discharge.

It is obvious, however, that my invention is capable of embodiment in a variety of specific forms, which will readily suggest themselves to one skilled in the art.

Referring to the drawings:

Fig. 1 illustrates the invention applied to a metallic telegraph circuit, in which the metallic battery supply is represented as a pair of condensers, each controlled by a pair of polar relays, for connection to the grounded charging source, and alternately to the metallic line conductors independently of the grounded source.

Fig. 2 shows a system differing from that of Fig. 1 in that the pairs of polar relays are replaced by polar relays having two sets of contacts and a tongue divided into two sections insulated from each other.

In Fig. 1, line conductors 10 and 11 are connected respectively to terminals A and $A_1$. At terminal A alternate paths are provided to either of which contact is made by means of the tongue 12 and contacts 13 and 14 of a transmitter 15. The path from contact 13 leads by way of the conductor 26, coils 22 and 21 of polar relays 2 and 1, and conductor 29 to the right hand contact 20 of relay 4. Similarly, the other path leads from contact 14 of transmitter 15, conductor 27, coils 23 and 24 of relays 3 and 4, respectively, and conductor 30 to the right hand contact 10 of relay 2. The relays 1, 2, 3 and 4 are normally biased to their right hand contacts by their respective biasing coils, 31, 32, 33 and 34, which are included in series in a circuit through grounded battery, as shown.

The condensers 5 and 6 are arranged for connection to grounded battery for charging, or for connection to the line conductors by way of the contacts of transmitter 15.

The charging circuit for condenser 5 is established from grounded generator or battery 16 through the left hand contacts of the relays 1 and 2. That is, the charging circuit for condenser 5 extends from the negative pole of grounded generator 16 through left hand contact 9 and tongue 42 of relay 2, through condenser 5, and thence by way of tongue 41 and left hand contact 7 of relay 1, to ground.

The charging circuit for condenser 6 extends from the positive pole of grounded generator or battery 16' by way of left hand contact 19 and tongue 44 of relay 4, through condenser 6, thence by way of tongue 43 and left hand contact 17 of relay 3 to ground.

When the tongues of all four relays are on their right hand contacts a discharge circuit is prepared from conductor 11 and terminal $A_1$ by way of each of two paths, one of which extends through contact 18 and tongue 43 of relay 3, condenser 6 and tongue 44 of relay 4 to the contact 20 of relay 4, and thence through the previously-traced path including conductor 29, coils 21 and 22 of relays 1 and 2, and conductor 26 to contact 13 of the transmitter 15.

The other path from line conductor 11 and terminal $A_1$ extends through conductor 40, contact 8 and tongue 41 of relay 1, through condenser 5 and tongue 42 of relay 2 to the contact 10 of relay 2, and thence through the previously-traced path including conductor 30, coils 24 and 23 of relays 4 and 3, and conductor 27 to the contact 14 of transmitter 15.

It is apparent that the position of tongue 12 of transmitter 15 determines which of the condensers 5 and 6 shall be connected between the terminals A and $A_1$ and line conductors 10 and 11. When the tongue 12 is on its left hand contact and the relays are on their right hand contacts, condenser 6 is connected between line conductors 10 and 11 by way of the coils 21 and 22 of relays 1 and 2. When the tongue 12 of transmitter 15 is on its right hand contact and the relays are on their right hand contacts, condenser 5 is connected between line conductors 10 and 11, or their terminals A and $A_1$, by way of the coils 23 and 24 of relays 3 and 4.

It may be noted that normally condensers 5 and 6 are tied together at the common point $A_1$ when the relays are on their right hand contacts, the other terminals of the condensers being connected through the relay coils to the alternate contacts 13 and 14 of transmitter 15. When the control relays 1 and 2 operate, however, the connection from the common terminal to condenser 5 is opened at contact 8 of relay 1 and a connection to ground by way of contact 7 is substituted. Through the operation of relay 2 the other terminal of condenser 5 is disconnected from the transmitter contact 14, and a charging circuit is completed to negative pole of grounded battery 16. However, as soon as the tongue of the transmitter 15 leaves its contact 13, the ground connection on condenser 5 is removed, and the connections to common terminal $A_1$ and to the transmitter contact are restored by the action of the biasing coils 31 and 32, thus applying minus potential to the right hand transmitter contact 14 and preparing a discharge circuit for condenser 5 to line.

In the same way, operation of relays 3 and 4 shifts the connections of condenser 6 from the common point $A_1$ and contact 13, and applies ground to condenser 6 at contact 17 and battery at contact 19 in order to charge the condenser from the grounded source 16'. As soon as the tongue 12 of transmitter 15 leaves its right hand contact, the ground is removed from condenser 6, the connection to common point $A_1$ is restored by the biasing coils 33 and 34, and plus potential is applied to the left hand contact of the transmitter 15 to prepare a discharge circuit from condenser 6 to line.

In Fig. 2, the pairs of polar relays 1, 2 and 3, 4 are replaced by single polar relays 50 and 60, each having two sets of contacts and a tongue divided into two sections insulated from each other. In order that it shall be apparent that the parts of these relays 50 and 60 perform the same functions that are performed by the pairs of relays of Fig. 1, the same numerals are used to designate corresponding elements as in Figs. 1 and 2.

Thus the relay 50, having biasing winding 52 and operating winding 51, is provided with two tongue sections 41 and 42 insulated from each other and designed to perform the same functions respectively as tongue 41 of relay 1 and tongue 42 of relay 2 in Fig. 1. The left and right hand contacts for tongue section 41 of relay 50 are indicated by the numerals 7 and 8; the left and right hand contacts of tongue section 42 of relay 50 are indicated by the numerals 9 and 10. Similarly, relay 60, having a biasing winding 62 and an operating winding 61, is provided with left and right hand contacts 17 and 18 for tongue section 43, and left and right hand contacts 19 and 20 for tongue section 44.

The grounded source 16 in Fig. 2 and conductors 29, 30 and 40, line conductors 10 and 11 and transmitter 15 with its tongue 12 and left and right hand contacts 13 and 14, correspond to the elements designated by the same numbers in Fig. 1.

The charging circuits for condensers 5 and 6 of Fig. 2 may be traced as follows: for condenser 5, from negative pole of grounded source 16 through left hand contact 9 and tongue 42 of relay 50, through condenser 5, tongue 41 and left hand contact 7 of relay 50 to ground; for condenser 6, from positive pole of grounded source 16' through left hand contact 19 and tongue 44 of relay 60, through condenser 6, tongue 43 and left hand contact 17 of relay 60 to ground.

The discharging circuit for condenser 6 to line extends from line conductor 10 at terminal A, through tongue 12 and left hand contact 13 of transmitter 15, conductor 26 and coil 51 of relay 50, conductor 29, right hand contact 20 and tongue 44 of relay 60, through condenser 6, thence through tongue 43 and right hand contact 18 of relay 60 to terminal $A_1$ and line conductor 11.

The discharging circuit for condenser 5 to line extends from line conductor 10 at terminal A, through tongue 12 and right hand contact 14 of transmitter 15, conductor 27 and coil 61 of relay 60, conductor 30, right hand contact 10 and tongue 42 of relay 50 through condenser 5, thence through tongue 41 and contact 8 of relay 50 and conductor 40 to terminal $A_1$ and line conductor 11.

The biasing circuit for relays 50 and 60 extends from grounded battery and resistance through coils 62 and 52 in series to ground.

The operation of the circuit of Fig. 1 is as follows:

It will be assumed that the condensers 5 and 6 are charged, to start with. When charged the biasing currents will cause the relays 1, 2, 3 and 4 to return to their right hand contacts. When all the relays are on their right hand contacts, plus and minus potentials will be applied to the contacts 13 and 14 of the transmitter 15.

If a pair of line conductors are connected to points A and A₁, minus current will be sent to line by way of the right hand contact 14 of transmitter 15. At the same time an operating circuit is established for relays 3 and 4 through the coils 23 and 24. Operation of relays 3 and 4 causes these relays to go from their right hand to their left hand contacts, to establish a charging circuit for condenser 6.

As soon as the tongue of the transmitting device 15 leaves its contact 14, the tongues of relays 3 and 4 will pass to their right hand contacts under the influence of their biasing coils, thereby putting potential on the left hand contact 13 of the transmitting device.

When the tongue of the transmitter 15 reaches its left hand contact 13, plus current will be sent to line, and relays 1 and 2 will pass from their right to their left hand contacts, thus putting condenser 5 on charge.

As soon as the tongue of the transmitting device leaves its left hand contact, the tongues of relays 1 and 2 will be moved by their biasing coils to their right hand contacts, thus putting potential on the right hand contact 14 of the transmitting device.

This cycle of operations is repeated in accordance with the movements of the tongue of the transmitter 15.

It will be observed that the condensers will be entirely free of ground, when their control relays are on their right hand contacts, and there will be no ground at all on the metallic system from the battery supply although the energy for transmitting a telegraph signal came originally from a grounded source of potential.

The operation of Fig. 2 is similar to that described in connection with Fig. 1 except that two relays perform the functions of the four relays of Fig. 1.

In Fig. 2, when the transmitter is on its right hand contact, minus current will be sent to line and relay 60 will operate to put condenser 6 on charge. As soon as the transmitter leaves its right hand contact, the biasing circuit of relay 60 will become effective to put plus potential on the left hand contact of the transmitter.

When the transmitter moves to its left hand contact, plus current will be sent to line and relay 50 will operate to put condenser 5 on charge. As soon as the transmitter leaves its left hand contact, the biasing circuit of relay 50 will become effective to put minus potential on the right hand contact of the transmitter.

Any fast high quality relay can be used for the control relays in this device. Either biased polar relays or spring biased high grade single current relays can be employed.

In practice special tongue and spring contacts would be used to shorten the travel time of the control relays so that even if continuity preserving devices were used for the transmitter there would be little loss of signal efficiency due to the time consumed by the control relay in passing from one contact to the other.

Numerous variations are possible in the systems disclosed without departure from the spirit of the invention.

Fig. 1, (or Fig. 2) for example, may be considered either a single, independent metallic telegraph circuit, or else one circuit of a plurality of telegraph circuits each provided with condensers (or small storage batteries) charged from a common source 16. In this case, it is obvious that duplicating the circuits of the figure would serve no useful purpose. It may be understood that each metallic telegraph circuit will be supplied with its own individual condensers, and control relays for connecting the condensers alternately to the common grounded source and to the individual lines into which the condensers are to discharge.

The transmitter 15, represented diagrammatically by tongue and contacts may, obviously, form part of a telegraph repeater or it may be the usual terminal transmitter.

I claim as my invention:

1. A telegraph system comprising a plurality of metallic telegraph circuits, a common grounded current source, and means for supplying metallic battery from said source to any of said metallic circuits independently of said grounded source.

2. In combination, a plurality of metallic telegraph circuits, a grounded current source, an auxiliary current source for each of said telegraph circuits, means for connecting said auxiliary sources to said grounded source and means for including said auxiliary sources in their respective metallic circuits independently of said grounded source.

3. In combination, a metallic telegraph circuit and a metallic current supply therefor comprising a grounded source, a pair of condensers and means for connecting said condensers alternately to said metallic circuit to the grounded source.

4. In combination, a metallic telegraph circuit and a metallic current supply therefor comprising a grounded source, a pair of condensers, control relays for said condensers and operating circuits for said control relays arranged to connect said relays to opposite terminals of said grounded source alternately.

5. In combination, a metallic telegraph circuit and a metallic current supply therefor comprising a grounded source, a pair of condensers designed to supply plus and minus currents respectively to said metallic circuit, circuits for said condensers adapted to be connected either to grounded source or to the metallic circuit, and means responsive to the flow of current from one of said condensers to connect the circuit of the other condenser to the grounded source.

6. In combination, a pair of line terminals, a metallic telegraph circuit and a metallic current supply therefor comprising a grounded source, a pair of condensers designed to supply plus and minus currents respectively to said metallic circuit, control relay-means individual to said condensers, an operating circuit for one of the control relay means extending between said line terminals by way of one condenser, and means under control of said operating circuit for connecting the other condenser in a charging circuit through said grounded source.

7. In combination, a pair of line terminals, a metallic telegraph circuit and a metallic current supply therefor comprising a grounded source, a pair of condensers designed to supply plus and minus currents respectively to said metallic circuit, control relay means individual to said condensers, a transmitter arranged to connect either of said condensers to said line terminals by way of the operating circuit of one of said control relay means, and means under control of the operated control relay means for connecting the other condenser in a charging circuit through said grounded source.

8. In combination, a pair of line terminals, a metallic telegraph circuit and a metallic current supply therefor comprising a grounded source, a pair of condensers designed to supply plus and minus currents respectively to said metallic circuit, a charging circuit for each condenser extending through said grounded source, a discharging circuit for each condenser extending to the line terminals and means in the discharging circuit of each condenser for closing the charging circuit of the other condenser.

9. In combination, a pair of line terminals, a metallic telegraph circuit and a metallic current supply therefor comprising a grounded source, a pair of condensers designed to supply plus and minus currents respectively to said metallic circuit, discharging circuits for the condensers comprising alternate contacts of a transmitter, and means operative upon closure of one of the contacts of the transmitter to discharge one of the condensers to line and charge the other from the grounded source, and means operative upon opening of the closed transmitter contact to prepare a discharge for said other condenser.

10. In a metallic battery supply for metallic circuits a pair of line terminals, a grounded current source, a pair of condensers having a common terminal connected to one line terminal and individual terminals connectable through a transmitter to the other line terminal, means responsive to operation of the transmitter for opening the connection from the common terminal to either condenser and connecting the condenser to said grounded current source.

11. In a metallic battery supply for metallic circuits, a pair of line terminals, a grounded current source, a pair of condensers having a common terminal connected to one line terminal and individual terminals connectable through alternate contacts of a transmitter to the other line terminal, means responsive to closure of one of the transmitter contacts for opening the connection from the common terminal to one of the condensers and connecting the condenser to said grounded current source.

12. In a metallic current supply for metallic circuits, a pair of line terminals, a grounded current source, a pair of condensers having a common terminal connected to one line terminal and individual terminals connectable through alternate contacts of a transmitter to the other line terminal, means responsive to closure of one of the transmitter contacts for opening the connection from the common terminal to one of the condensers and charging the condenser from said grounded current source, and means responsive to subsequent opening of said transmitter contact for applying potential from said charged condenser to said other transmitter contact.

13. The method of supplying metallic battery from a grounded source which comprises charging a plurality of capacities from a grounded source, discharging one of the capacities to line independently of said grounded source and utilizing the discharge of said one capacity to initiate a charging of the other capacity from said grounded source.

14. The method of supplying metallic battery from a grounded source which comprises charging a plurality of capacities alternately from a grounded source, discharging each of said capacities to line independently of said grounded source and initiating the charging of the other capacity by the discharge of the first capacity.

In testimony whereof I affix my signature.

RONALD V. MORGENSTERN.